UNITED STATES PATENT OFFICE.

JOHN C. G. HÜPFEL, OF NEW YORK, N. Y.

IMPROVEMENT IN MASHING PROCESSES FOR BREWERIES.

Specification forming part of Letters Patent No. 157,521, dated December 8, 1874; application filed November 14, 1874.

*To all whom it may concern:*

Be it known that I, JOHN C. G. HÜPFEL, of the city, county, and State of New York, have invented a new and Improved Mashing Process for Breweries, of which the following is a specification:

The object of my invention is to provide for breweries an improved process of mashing the malt, so that a clearer and stronger malt taste be imparted to the worts, and thereby a more palatable beer be produced.

My invention consists in the admixture to the common bruised malt of a suitable quantity of ground and bolted malt, and treating this mixture in the mash-tub.

The common mode of preparing the malt for mashing is by breaking or bruising the same in a mill, like a large coffee-mill, or passing it between revolving steel rollers, so that the water can find its way into all the parts of the grain, and soak it thoroughly, without producing a pasty mass, which is the case when the malt is ground too finely. The husks act as a separating medium, and retain the mash in a loose state, admitting the drawing off of the sweet worts without the stuffing up of the perforated false bottom of the mash-tub. This has been found a main objection to the use of malt ground in fine state like flour.

For the purpose of preserving the advantage arising from the presence of the husks in the mash, as a means of mechanical separation, and with a view to the production of a clearer and stronger malt taste, which can be imparted to the beer in a higher degree by the addition of finely-ground malt, I mix with the common bruised malt a suitable quantity of finely-ground and bolted malt flour. This is obtained by slightly moistening the malt before grinding, for the purpose of giving greater elasticity to the husk-skins, and loosening them from the grain, which treatment assists materially in the separation from the malt flour during the grinding and bolting process.

The quantity of ground and bolted malt to be added should be in proportion of about one-fourth or one-half of the malt used, the rest being bruised malt. The proportion of ground malt should vary according to the coarser or finer bruising of the latter. The water acts, during the mashing process, fully on all the particles of the malt in the usual manner, and takes up from the ground malt that agreeable and pleasant malt taste which is retained during fermentation, and produces a superior quality of beer, with that peculiarly clear and palatable malty taste, that is esteemed so highly by connoisseurs. The drawing off of the worts is at the same time accomplished in the usual unobstructed manner through the bottom of the mash-tub.

Having thus described my invention, I claim as new and desire to secure by Letters Patent—

The improved mashing process for breweries, consisting in the admixture to the common bruised malt of a suitable quantity of finely-ground and bolted malt, to be mashed therewith for the purpose of imparting a stronger malt taste in the beer produced without interfering with the drawing off of the worts from the mash-tub, substantially as herein set forth.

JOHN C. G. HÜPFEL.

Witnesses:
PAUL GOEPEL,
T. B. MOSHER.